United States Patent
Kawamura

[11] Patent Number: 6,144,130
[45] Date of Patent: *Nov. 7, 2000

[54] STRUCTURE OF ROTOR FOR GENERATORS AND METHOD OF MANUFACTURING THE SAME ROTOR

[75] Inventor: Hideo Kawamura, Kanagawa-ken, Japan

[73] Assignee: Isuzu Ceramics Research Institute Co., Ltd., Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/009,894

[22] Filed: Jan. 21, 1998

[30] Foreign Application Priority Data

| Jan. 21, 1997 | [JP] | Japan | 9-020937 |
| Jan. 21, 1997 | [JP] | Japan | 9-020938 |
| Mar. 3, 1997 | [JP] | Japan | 9-061717 |
| Mar. 4, 1997 | [JP] | Japan | 9-063978 |

[51] Int. Cl.⁷ .............................................. H02K 21/12
[52] U.S. Cl. ........................ 310/156; 310/254; 310/261; 310/264; 310/268
[58] Field of Search .................. 310/156, 254, 310/291, 258; 29/596, 598

[56] References Cited

U.S. PATENT DOCUMENTS

| 4,633,113 | 12/1986 | Patel | 310/156 |
| 4,729,160 | 3/1988 | Brown | 29/598 |
| 4,742,259 | 5/1988 | Schaefer et al. | 310/156 |
| 4,910,861 | 3/1990 | Dohogne | 29/598 |
| 4,973,872 | 11/1990 | Dohogne | 310/156 |
| 5,233,248 | 8/1993 | Kawamura et al. | 310/88 |
| 5,313,131 | 5/1994 | Hibino et al. | 310/254 |
| 5,554,900 | 9/1996 | Pop, Sr. | 310/156 |
| 5,717,263 | 2/1998 | Cox | 310/74 |
| 5,828,152 | 10/1998 | Takeda et al. | 310/156 |

FOREIGN PATENT DOCUMENTS

| 60-162977 | 10/1985 | Japan . |
| 62-272850 | 11/1987 | Japan | 310/156 |
| 2-146975 | 12/1990 | Japan | 310/156 |
| 7-236260 | 11/1995 | Japan | 310/156 |
| 2 302 455 | 1/1997 | United Kingdom | 310/156 |

OTHER PUBLICATIONS

Patent Abstracts of Japan, vol. 107, No. 245 (E–1365), May 17, 1993 & JP 04 368440 A, Dec. 21, 1992.
Patent Abstracts of Japan, vol. 015, No. 470 (E–1139), Nov. 28, 1991 & JP 03 203540 A, Sep. 5, 1991.
Patent Abstracts of Japan, vol. 015, No. 204 (E–1071), May 24, 1991 & JP 03 056049 A, Mar. 11, 1991.
Patent Abstracts of Japan, vol. 010, No. 244 (E–430), Aug. 22, 1986 & JP 61 073559 A, Apr. 15, 1986.
Patent Abstracts of Japan, vol. 1997, No. 01, Jan. 31, 1997 & JP 08 242549, Sep. 17, 1996.
Patent Abstracts of Japan, vol. 013, No. 496 (E–843), Nov. 9, 1989 & JP 01 198261 A, Aug. 9, 1989.
Patent Abstracts of Japan, vol. 013, No. 558 (E–858), Dec. 12, 1989 & JP 01 231644 A, Sep. 14, 1989.

Primary Examiner—Elvin Enad
Attorney, Agent, or Firm—Browdy and Neimark

[57] ABSTRACT

The present invention provides a structure of a rotor for a generator in which a rotor capable of being ground very easily with a high accuracy is incorporated. This structure of a rotor comprises a rotor mounted fixedly on a rotary shaft supported rotatably on housings. The rotor comprises cylindrically arranged members in which segmental members of permanent magnets are assembled together cylindrically, and an outer cylinder provided on an outer circumference of the cylindrically arranged members and comprising windings or woven cloths of fibers. A resin material capable of being ground is packed in clearances between the cylindrically arranged members and outer cylinder and in the clearances in the outer cylinder.

23 Claims, 6 Drawing Sheets

STRUCTURE OF ROTOR FOR GENERATORS AND METHOD OF MANUFACTURING THE SAME ROTOR

BACKGROUND OF THE INVENTION

1. Field of the Invention

This invention relates to a structure of a rotor for a generator comprising a rotor formed of a permanent magnet mounted on a rotary shaft, and a stator disposed around an outer circumference of the rotor; and a method of manufacturing the rotor.

2. Description of the Prior Art

As the performance of a permanent magnet has been improved, the opportunities in which a permanent magnet is used as a rotor of a generator have increased. A generator-motor using a permanent magnet as a rotor obtains high generating and power efficiencies, and can be formed to a simple structure. Owing to these characteristics, such a generator-motor has recently come to be used much in industrial machines and tools.

When a rotational frequency of a rotor in a conventional generator-motor increases as a voltage and an amperage increase, a large centrifugal force occurs in the rotor, so that the rotor is required to withstand the centrifugal force. Therefore, an outer circumference of the permanent magnet constituting the rotor is reinforced with a reinforcement ring so that the rotor can withstand the centrifugal force.

The known generators using a permanent magnet as a rotor include, for example, the miniaturized generator disclosed in Japanese Utility Model Laid-Open No. 146975/1990, the high output AC generator disclosed in Japanese Patent Laid-Open No. 236260/1995, the permanent magnet type rotary machine disclosed in Japanese Patent Laid-Open No. 272850/1987 or the dynamo-electric machine disclosed in Japanese Utility Model Laid-Open No. 162977/1985.

In the miniaturized generator disclosed in Japanese Utility Model Laid-Open No. 146975/1990, a main shaft and a rotor are connected together via a governor mechanism in which a governor weight is supported pivotably on a pair of links so that the rotor is moved in the direction in which the rotor comes out of a stator by separating the governor weight from the main shaft by a centrifugal force in accordance with the rotational frequency of the main shaft and thereby reducing an angle between the links.

The high output AC generator disclosed in Japanese Patent Laid-Open No. 236260/1995 is adapted to control a generating power properly by controlling a magnetic flux density in accordance with a rotation speed thereof, and provided with a control ring relatively rotatably between a rotor and a stator, and a permeable member engageable with and disengageable from the control ring.

In the permanent magnet type rotary machine disclosed in Japanese Patent Laid-Open No. 272850/1987, a permanent magnet is provided on a rotor, and also a pole piece-forming container adapted to guide a movable magnetic member diametrically by the rotation of the rotor in which the movable magnetic member is sealed.

The dynamo-electric machine disclosed in Japanese Utility Model Laid-Open No. 162977/1985 is provided on its rotatable support shaft with a magnetic flux density variable mechanism capable of varying the magnetic flux density of a magnetic circuit formed by a permanent magnet corresponding to the rotational frequency of the support shaft.

As mentioned above, in a generator formed by using a permanent magnet as a rotor rotating at a high speed, a permanent magnet constituting a rotor is produced mostly by sintering powder of an iron-neodymium alloy, and forming a sintered body thus obtained to a predetermined shape and precision. However, it is difficult to grind a permanent magnet comprising such a sintered body by a grinding tool due to the material of the permanent magnet. This causes the processing time for forming a permanent magnet into a rotor, a manday for subjecting a permanent magnet to various steps from a grinding step to a precision processing step and the rotor manufacturing cost to increase. A permanent magnet comprises a sintered body of an alloy of rare earth metals, and has a low processability. Since this sintered body is ground slowly so as to prevent a bit from being damaged, the processing cost increases greatly as compared with the material cost, so that the manufacturing cost becomes high.

In a generator using a permanent magnet as a rotor, generated power is represented by a product of a rotation speed of the rotor and the intensity of a magnetic field, and, therefore, the generated power increases in proportion to the rotation speed of the rotor. The intensity of the magnetic field is represented by a product of a magnetic force of the permanent magnet and an area thereof. When the rotational frequency of the rotor increases in accordance with an increase in the voltage and amperage, a large centrifugal force occurs therein. Since the rotor is broken if it does not withstand such a centrifugal force, so that the rotor is required to resist the centrifugal force. To meet the requirement, a permanent magnet constituting such a rotor is generally reinforced at an outer circumference thereof with a reinforcement ring so that the rotor can withstand the centrifugal force.

A cylindrical permanent magnet is usually made by filling a cylindrical mold of a nonmagnetic material with alloy powder containing elements, such as iron, neodymium, samarium and cobalt, solidifying the alloy powder by compression molding the same at a high temperature, and instantaneously sintering the resultant molded body by high-frequency heating with the NS poles, i.e., lines of magnetic force in the alloy aligned by applying a magnetic force thereto during the sintering of the molded body. After a magnetic force is applied to the molded body, a cylindrical sintered body of a permanent magnet is taken out of the mold, and the outer and inner circumferential surfaces thereof are ground. On the other hand, a thin-walled outer cylinder comprising wound carbon continuous fiber is formed as a member for reinforcing the sintered body. The sintered body of a permanent magnet is press fitted in the thin-walled outer cylinder to finish a rotor.

However, it is difficult and takes a long time to grind the outer and inner circumferential surfaces of a sintered body of a permanent magnet, and this causes the manufacturing cost to increase greatly. It is difficult to form a permanent magnet cylindrically to a large diameter, and a permanent magnet into a large-diameter rotor. Consequently, large output generation cannot be expected as long as a permanent magnet is used as a rotor. Therefore, issues to be resolved are how to develop a method of grinding a sintered body of a permanent magnet easily, speedily and precisely so as to reduce the manufacturing cost.

Since the cost of the material for a permanent magnet, such as iron, neodymium, samarium and cobalt is high, utilizing the material efficiently is desired. As the dimensions of a generator increase, those of a permanent magnet have to be increased. To meet this requirement, using segmented permanent magnet can be conceived. When a permanent magnet is divided into segment members, in to what type of a structure should these members be combined is an issue.

When a rotor in a generator is rotated at a high speed, a large centrifugal force is exerted thereon. Therefore, it is always demanded that a permanent magnet be reinforced for the retention of the same, i.e., for preventing the permanent magnet from being bursted by the centrifugal force. Consequently, studying a structure capable of increasing the strength of a permanent magnet is required. When a rotor in a generator is rotated at a high speed, a high output is obtained, and this poses an issue as to what structure is required for a rotor having smaller weight, a higher rigidity and a higher resistance to a high-speed rotation.

When a large output is obtained from a generator by rotating a rotor, which comprises a permanent magnet, at a high speed, the temperature increases due to an iron loss and a copper loss, and the permanent magnet is demagnetized due to the heat generated. When demagnetization occurs in the permanent magnet constituting a rotor, the permanent magnet is decomposed, so that it has to be remagnetized. Consequently, when the dimensions of the rotor increases, the cost of regenerating the permanent magnet increases correspondingly, and a loss becomes larger. Therefore, when a rotor is formed of a permanent magnet, it is necessary that the rotor be cooled so that demagnetization does not occur in the permanent magnet, and developing the techniques for cooling a rotor effectively is an issue encountered in the prior art.

SUMMARY OF THE INVENTION

An object of the present invention is to provide a structure of a rotor for generators, formed of a permanent magnet obtained by sintering powder of iron or neodymium, the regions of the rotor in which the grinding is necessary for the permanent magnet being formed out of a nonmagnetic material containing an easily processable material, such as a resin or a metal so as to enable the outer and inner circumferential surfaces of a sintered body to be ground easily with a high-precision, whereby the manufacturing cost is reduced; and a method of manufacturing the same rotor.

Another object of the present invention is to provide a structure of a rotor for generators, wherein, in order to form a rotor comprising a permanent magnet, mounted on a large-diameter rotary shaft and produced by sintering powder of iron or neodymium, at a greatly reduced manufacturing cost, a permanent magnet is formed cylindrically by a plurality of cross-sectionally nearly rectangular fan-shaped segmental members and provided on a cylindrical laminate member of a high permeability to set the segmental members as alternating NS poles, an outer side surface of the cylindrical member being covered with a reinforcement member of a nonmagnetic material, clearances between the segmental members being filled with a reinforcement material-containing nonmagnetic metal or resin and solidified, a light porous cylindrical member impregnated with a nonmagnetic metal or resin being provided between the rotary shaft and cylindrical laminate member, whereby the securing of the rigidity of the rotor, the reduction of the weight thereof, a high-speed rotation thereof and a high output from the generator can be attained.

Still another object of the present invention is to provide a structure of a rotor for generators, wherein a rotor is formed by making a permanent magnet having a plurality of cylindrically arranged cross-sectionally nearly rectangular fan-shaped segmental members, arranging members of a nonmagnetic metal or resin between the segmental members to form a cylindrical member, covering an outer side surface of the cylindrical member with a reinforcement member of a nonmagnetic material, providing on the inner side of the cylindrical member with a cylindrical laminate member of a permeable material and a cylindrical porous member having a plurality of air ports extending from one end thereof to the other, and providing a cooling means, to thereby enable the rotor to be cooled with air currents and prevent the permanent magnet from being demagnetized even when heat occurs due to a copper loss or an iron loss, the rigidity of the rotor to be secured, the reduction of the weight of the rotor to be attained, the rotor to be rotated at a high speed, and a high output to be obtained.

The present invention relates to a structure of a rotor for a generator comprising a rotary shaft supported rotatably on housings, a rotor comprising permanent magnets mounted on the rotary shaft, and a stator provided around an outer circumference of the rotor and fixed to the housings, the rotor being formed of cylindrically arranged members comprising permanent magnets, an outer cylinder provided around outer circumferences of the cylindrically arranged members and comprising windings or woven cloths of fibers, and a machinable nonmagnetic material packed in a clearance between the cylindrically arranged members and outer cylinder and clearances among the fibers.

In this structure of a rotor, the nonmagnetic material comprises a resin or a metal. The cylindrically arranged members are formed of segmental members comprising permanent magnets, and an inner cylinder comprising a resin material is provided on an inner circumference of the cylindrically arranged members, a resin material constituting the nonmagnetic material being interposed between the segmental members.

The windings constituting the outer cylinder are solidified by a resin material constituting the nonmagnetic material. Ceramic fibers or carbon fibers of a high heat conductivity are mixed in the resin material so as to improve the strength and heat conductivity thereof.

The aluminum or an alloy thereof is fused to boundary portions between the outer cylinder and cylindrically arranged members and boundary portions between the cylindrically arranged members and inner cylinder, and the outer cylinder is reinforced with windings of ceramic fibers. The inner cylinder and boundary portions contain iron powder so as to improve the permeability thereof.

The outer cylinder, inner cylinder and boundary portions contain a resin material, and have resin portions of a thickness at least not smaller than that of grinding margins. Another example of the outer cylinder comprises an aluminum material, and has an aluminum portion of a thickness at least not smaller than that of a grinding margin.

In another embodiment of this structure of a rotor, the windings constituting the outer cylinder are formed of carbon fibers or ceramic fibers, and the permanent magnets constituting the cylindrically arranged members are formed by molding and solidifying mixed powder of materials including at least iron, neodymium, samarium and cobalt, sintering the resultant product and magnetizing the sintered product. The outer cylinder is formed by melting a resin material and impregnating windings or woven cloths of carbon fibers or ceramic fibers with the resultant molten resin material.

This structure of a rotor is formed by sealing cylindrically arranged members comprising permanent magnets in an outer cylinder comprising windings or woven cloths of ceramic fibers. In this structure of a rotor, a thin-walled member of elastic carbon or graphite is provided on an inner side of the outer cylinder so as to improve the compatibility of the outer cylinder and cylindrically arranged members with each other.

In this structure of a rotor, cylindrical laminated members comprising a permeable material is provided on an inner side of the cylindrically arranged members, and cylindrically arranged porous members mounted fixedly on the rotary shaft and comprising a resin material-impregnated nonmagnetic structural material on an inner side of the cylindrical laminated members. The permanent magnets constituting the cylindrically arranged members are formed by cylindrically arranging cross-sectionally nearly rectangular fan-shaped segmental members, and these segmental members are set as alternating NS poles. A nonmagnetic material is provided between adjacent segmental members.

The reinforcement member constituting the outer cylinder is formed by solidifying carbon fibers or ceramic fibers with a resin material. In another example, the reinforcement member is formed out of nonmagnetic stainless steel into wires or a thin plate.

The cylindrical laminate member is formed by laminating a plurality of cylindrical silicon steel plates in the axial direction. The resin material mentioned above contains ceramic fibers or carbon fibers of a high heat conductivity mixed therein so as to improve the strength and heat conductivity.

The cylindrically arranged porous members comprise stainless steel or aluminum, or a nonmagnetic ceramic material, such as alumina or silicon nitride, and the porous portions thereof are impregnated with a nonmagnetic resin.

This structure of a rotor is provided with ports, through which cooling air passes, in the housings, and the cylindrically arranged members comprise segmental members formed of permanent magnets combined together cylindrically, the rotor being provided with cylindrical laminated members disposed on the inner side of the cylindrically arranged members, cylindrical porous member disposed on the inner side of the cylindrical laminated members, mounted fixedly on a rotary shaft, having a plurality of air ports extending from one end thereof to the other and comprising a nonmagnetic material, and a cooling fan mounted on the rotary shaft so as to cool the cylindrically arranged members with an air current. In this structure of a rotor, the permanent magnets constituting the cylindrically arranged members are formed by cylindrically arranging cross sectionally nearly rectangular fan-shaped segmental members, and these segmental members are set as alternating NS poles, a nonmagnetic material being provided between adjacent segmental members.

The cooling fan comprises a centrifugal fan, whereby an air current is generated which flows from the ports in one end of the housing to the ports in the other through the air ports in the cylindrical porous member. Fins for guiding the air current to the extension portions of the segmental members or cylindrical laminated members are provided on the portion of the rotary shaft which is in an upstream portion of the air current generated by the centrifugal fan.

The cylindrically arranged porous members are formed of honeycomb portions constituting the air ports, and reinforcement portions comprising a metal or a resin material extending circumferentially in part and radially so as to reinforce the honeycomb portions. The reinforcement portions comprise outer cylinders formed by solidifying nonmagnetic carbon fibers or ceramic fibers with a resin material, or outer cylinders comprising windings of wire rods of nonmagnetic stainless steel or plate members of nonmagnetic stainless steel.

The cylindrical members are formed by laminating a plurality of cylindrical silicon steel plates in the axial direction thereof.

In order to form a material inserted between the segmental members constituting the cylindrically arranged members of a resin material, ceramic fibers or carbon fibers of a high heat conductivity are mixed therein so as to improve the strength and heat conductivity of the resin material. The clearances between the segmental members constituting the rotor and the reinforcement portions of the cylindrical porous member have structures formed by pouring molten aluminum thereinto and solidifying the same.

Since this structure of a rotor is constructed as described above, it can be incorporated as a rotor in a generator-motor AC machine for converting rotational energy into electric energy, and the AC machine is capable of being applied easily to a cogeneration system and an energy recovery unit for automobile engines, withstanding predetermined high-speed rotation, and, moreover displaying predetermined performance since the rotor is precisely ground.

Since this structure of a rotor is formed cylindrically as mentioned above, by packing a nonmagnetic resin material between a plurality of segmental members of permanent magnets constituting the rotor, a combined permanent magnet of a generally large diameter can be obtained, which permits a large-sized generator to be made. Moreover, light, resin-impregnated cylindrical porous member is mounted on a rotary shaft constituting an inner circumferential side portion of the permanent magnets, so that the diameter of the rotor can be increased to a high level, the weight of the rotor kept light in spite of such an increased diameter thereof.

Since the permanent magnets can be formed to a desired large diameter by combining a plurality of segmental members together, the peripheral speed can be increased to a high level, and generated electric power can be increased. Since cylindrical laminated permeable members comprising silicon steel plates are provided on the inner circumferential side of the permanent magnets, a high-output generator having a low resistance of magnetic flux passages can be produced.

This structure of a rotor is provided with reinforcement members, which comprise resin material-containing carbon fibers and ceramic fibers, or thin plates or windings of stainless steel, and which are formed cylindrically, around the outer circumferences of cylindrically arranged members. Therefore, the rotor can be reinforced to a strength overcoming a rotor-bursting force due to the centrifugal force of the cylindrical member, and reinforced cylindrically arranged members can be formed easily. Namely, since reinforcement members comprising cylindrical bodies formed by solidifying metal- or resin material-containing carbon fibers or ceramic fibers, or cylindrical bodies of stainless steel are provided on the outer circumferences of the cylindrically arranged members, so that the strength of the cylindrically arranged members can be improved.

Since the cylindrical laminated permeable members and cylindrical porous member are provided on the inner side of the cylindrically arranged members, a high efficiency can be obtained. Moreover, even when the cylindrical members are formed to a large diameter, the cylindrical porous member, light structural members can be formed as a high-rigidity shaft body, and this enables a high-speed high-output permanent magnet type generator of a high durability to be produced.

In this structure of a rotor, a core portion of the rotor mounted fixedly on the rotary shaft is formed of cylindrical porous member having air ports extending from one end thereof to the other as described above with a cooling fan mounted on the rotary shaft, whereby the cylindrical porous member of a large area are cooled with an air current generated by the cooling fan. This enables the permanent magnets to be cooled very effectively, the demagnetization of the permanent magnets to be prevented, the cylindrically arranged members as a whole to be formed as a large-diameter permanent magnet, and a large-sized generator to be obtained.

Since the cylindrical laminated permeable members and cylindrical porous member are provided on the inner side of the cylindrically arranged members, magnetic flux flows effectively, and an increase in the temperature can be prevented. Even when the cylindrically arranged members are formed to a large diameter, rigidity and strength problems thereof do not arise owing to the provision of the cylindrical porous member, and, moreover, the permanent magnets as a whole can be formed to a large diameter. Accordingly, the peripheral speed of the permanent magnets becomes high, and a high output can be attained.

Since the cylindrical porous member of honeycomb structures is mounted on the rotary shaft constituting the inner circumferential portions of the cylindrically arranged members of permanent magnets, the cylindrical porous member can be cooled effectively even when an air volume is low, and a shaft as a whole fixed to the rotary shaft can be formed to a large diameter. Since the shaft as a whole comprises the light cylindrical porous member, the weight of the rotor can be reduced to a low level in spite of the fact that the shaft as a whole is formed to a large diameter. Since the permanent magnet portion can be formed to a large diameter, the peripheral speed of the permanent magnets can be increased to a high level, and the generated power can be increased. The cylindrical laminated members having a permeability and comprising silicon steel plates are provided on the inner circumferential side of the permanent magnets, the occurrence of an eddy current can be prevented.

The present invention also relates to a method of manufacturing a rotor for generators, comprising the steps of forming a thin-walled outer cylinder comprising windings or woven cloths by winding up carbon fibers or ceramic fibers, placing the outer cylinder in an annular sintering mold, packing magnetic powder of at least iron and neodymium on the inner side of the outer cylinder, pressure molding the magnetic powder, and turning the magnetic powder into permanent magnets by thermally sintering the magnetic powder while magnetizing the same in an oxygen free atmosphere.

In this rotor manufacturing method, a resin material is permeated under pressure in clearances, which occur in boundary portions of the permanent magnets including the outer cylinder, during the sintering of the magnetic powder, and clearances between the fibers. In the resin material, ceramic fibers of a high heat conductivity are mixed so as to increase the strength and heat conductivity thereof.

According to this rotor manufacturing method, the cylindrically arranged members comprising permanent mag nets of sintered bodies can be reinforced with carbon fibers of ceramic fibers, and the outer cylinder comprising a resin material and carbon fibers can be ground easily, speedily and highly precisely as mentioned above. Then, only the inner circumferential surfaces of the cylindrical members are grounded with reference to the outer circumferential surface of the outer cylinder. Therefore, the processing time can be reduced to not more than a half of that in a prior art method of this kind, so that the manufacturing cost can be greatly reduced. Especially, the permanent magnets are demagnetized at a temperature of not lower than 200° C., and they are therefore used in an atmospheric environment of not higher than 200° C. Even when a resin material is permeated between the outer cylinder and cylindrically arranged members, the strength of the permanent magnets can be maintained without the melting and deterioration of the resin material.

DETAILED DESCRIPTION OF THE EMBODIMENTS

The embodiments of the structure of a rotor for generators according to the present invention and a method of manufacturing the same will now be described with reference to the drawings.

First, a first example of a generator in which the rotor according to the present invention is incorporated will be described with reference to FIGS. 1–4.

Figure 1:
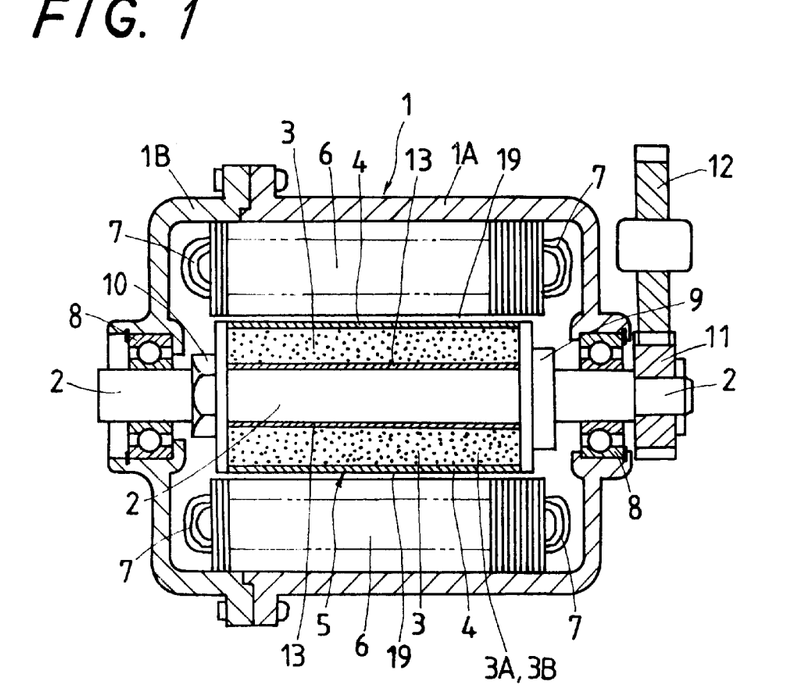
FIG. 1 is a sectional view showing a first example of a generator in which the structure of a rotor according to the present invention is incorporated.

A first example of a generator in which the structure of a rotor is incorporated has mainly a rotary shaft 2 supported rotatably on a case 1, which comprises a pair of housings 1A, 1B, via a pair of bearings 8, a rotor 5 mounted fixedly on the rotary shaft 2, and a stator 6 provided around an outer circumference of the rotor 5 and fixed to the case 1 with a clearance formed between the stator 6 and rotor 5. The rotor 5 is engaged at one end thereof with a stopper 9 mounted on the rotary shaft 2, and fixed at the other end to the rotary shaft 2 by a locking nut 10 screwed to the rotary shaft 2. A transmission gear 11 is mounted fixedly on one end of the rotary shaft 2, and an input or output gear 12 is meshed with the transmission gear 11. The stator 6 is formed by winding a stator coil 7 around thin laminated plates. For example, when the gear 12 is connected to an output shaft of an engine, the rotational force of the engine is transmitted to the rotary shaft 2 of the generator, and power is produced by the generator.

The rotor 5 comprises, especially, cylindrically arranged members 3 formed of permanent magnets, and an outer cylinder 4 provided on outer circumferences of the cylindrically arranged members 3, and formed as a reinforcement member comprising windings of long carbon fibers, this structure being provided with a resin material (plastic), a nonmagnetic material on the outer surface thereof and characterized in that the structure can be ground easily with a high accuracy.

Figure 2:
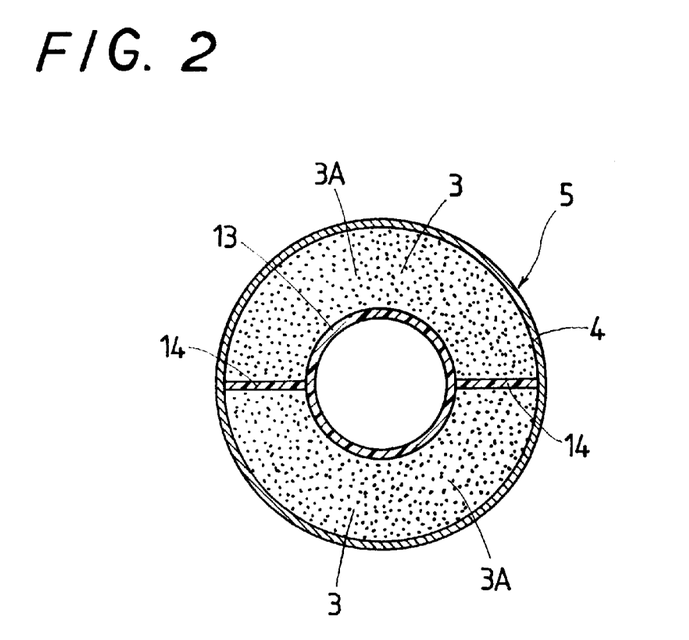
FIG. 2 is a sectional view showing a first embodiment of the structure of a rotor for the generator of FIG. 1.
Figure 3:
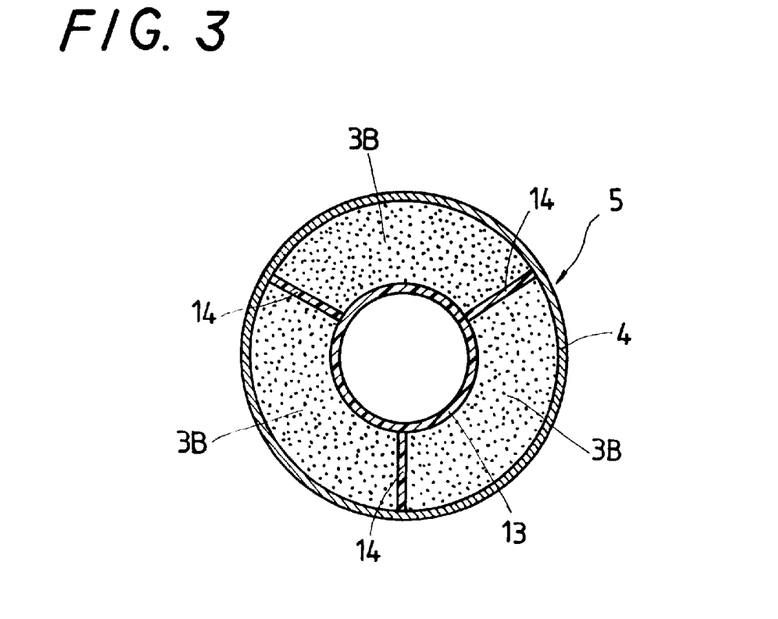
FIG. 3 is a sectional view showing a second embodiment of the structure of a rotor for the generator of FIG. 1.

As shown in FIG. 2 or 3, the rotor 5 comprises cylindrically arranged members 3 formed by assembling segmental members 3A or 3B, which are formed of permanent magnets, cylindrically, an outer cylinder 4 formed by solidifying carbon fibers, which are wound around outer circumferences of the cylindrically arranged members 3, with a resin material, an inner cylinder 13 provided on inner circumferences of the cylindrically arranged members 3 and comprising a carbon fiber-containing resin material, and boundary members 14 interposed between adjacent segmental members 3A or 3B and comprising carbon fiber-containing resin material. The resin material contained in the inner cylinder 13 and boundary members 14 can comprise the same plastic, i.e. resin material as is contained in the outer cylinder 4.

A first example of the cylindrically arranged members 3 comprising two divisional portions is shown in FIG. 2, and a second example thereof comprising three divisional portions in FIG. 3. The cylindrically arranged members 3 may also comprise not less than four divisional portions. The shape and size of the divisional portions may not be equal, i.e., these members 3 may be divided unequally.

The resin material constituting the inner cylinder 13 positioned on the inner circumferences of the segmental members 3A, 3B and boundary members 14 positioned between adjacent segmental members 3A, 3B contains a ceramic fiber material mixed therein, which has a high heat conductivity, and which comprises AlN and SiC, so as to improve the strength and heat conductivity of the material. The aluminum or an alloy thereof is fused to boundary portions between the outer cylinder 4 and cylindrically arranged members 3, and between the cylindrically arranged members 3 and inner cylinder 13, whereby the two parts on both sides of the boundary portions are fixed to each other firmly with the radiation of heat promoted excellently. The inner cylinder 13 and the boundary members 14 further contain iron powder so as to increase the permeability thereof.

The outer cylinder 4, inner cylinder 13 and boundary members 14 which constitute the rotor 5 have thicknesses at least not less than that of a grinding margin comprising a resin material. Similarly, when an aluminum material is used for the outer cylinder 4, it has a thickness at least not less than that of a grinding margin comprising aluminum. Accordingly, the segmental members 3A, 3B can be ground to predetermined sizes easily and speedily with a high-precision, and high-precision cylindrically arranged members 3 can be made by assembling the segmental members 3A, 3B. Not only the outer cylinder 4 of the rotor 5 but also the inner cylinder 13 thereof can be cut to predetermined sizes easily and speedily with a high-precision, and a high-precision rotor 5 can thereby be formed. Therefore, this structure of a rotor for generators enables the manufacturing cost to be greatly reduced.

Figure 4:
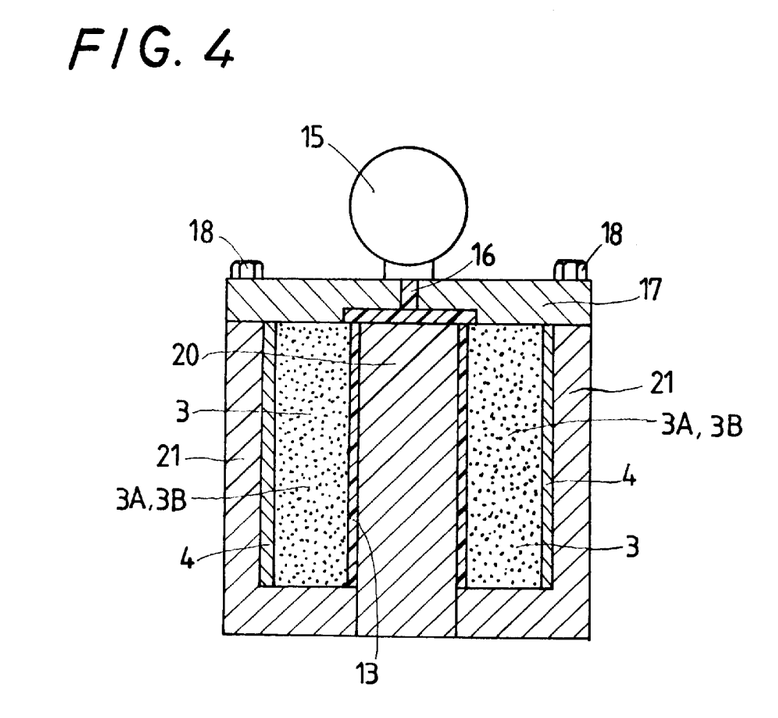
FIG. 4 is a schematic diagram describing a step of manufacturing the rotor of FIG. 2.

A method of manufacturing this structure of a rotor for generators will now be described with reference to FIG. 4. First, magnetic powder containing elements, such as iron, neo-dymium, samarium and cobalt is packed in a mold comprising semicircular or fan-shaped segments, and the powder is then compression molded at a high temperature and thereby solidified to form a molded body, which is then sintered while applying thereto a magnetic field so that magnetic poles can occur in a predetermined direction of the molded body, whereby the lines of magnetic force are set in order. During this time, the molded bodies in the segments are set to the shapes substantially identical with predetermined shapes prior to a sintering operation so that the molded bodies have high-precision final shapes. The segmental members 3A, 3B of sintered bodies of permanent magnets are then taken out of the mold.

A thin-walled outer cylinder 4 is made as a sintered body reinforcing member by winding up long carbon fibers and solidifying the resultant product with a resin material. The thin-walled outer cylinder 4 is placed in a gypsum mold comprising a core 20 and an outer mold member 21, and segmental members 3A, 3B of permanent magnets are then fitted in the thin-walled outer cylinder 4 so that clearances are formed between the segmental members 3A, 3B and core 20 and between adjacent segmental members 3A, 3B.

A lid 17 is put on the gypsum mold comprising the core 20 and outer mold member 21, and fixed thereto by bolts 18. A mixed material containing a resin material and carbon fibers is supplied from a high-pressure tank 15 to the clearances between the segmental members 3A, 3B and core 20 and between adjacent segmental members 3A, 3B through a supply passage 16 formed in the lid 17, to fill the clearances therewith, and the resin material is solidified. During this time, the resin material in the mixed material from the high-pressure tank permeates into the thin-walled outer cylinder 4 as well through the clearances between the segmental members 3A, 3B, and is united with the carbon fibers in the thin-walled outer cylinder 4. Thus, very strongly solidified cylindrically arranged permanent magnets are formed. The solidified cylindrically arranged members 3 are taken out from the gypsum mold, and the outer and inner circumferential surfaces of the outer cylinder 4 forming the cylindrically arranged members 3 are ground to obtain the members 3 of permanent magnets.

Figure 5:
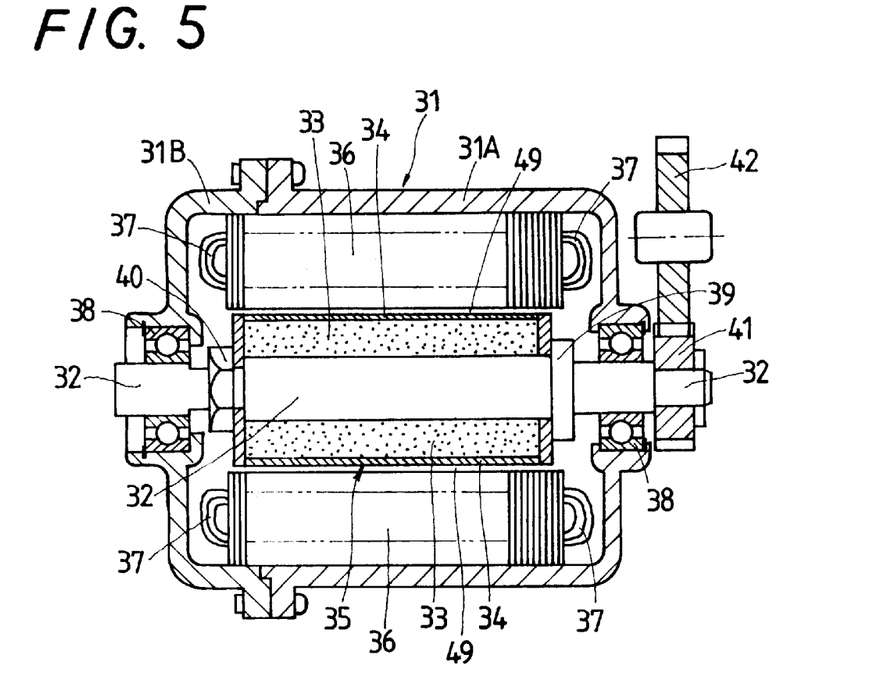
FIG. 5 is a sectional view showing a second example of a generator in which the structure of a rotor according to the present invention is incorporated.
Figure 6:
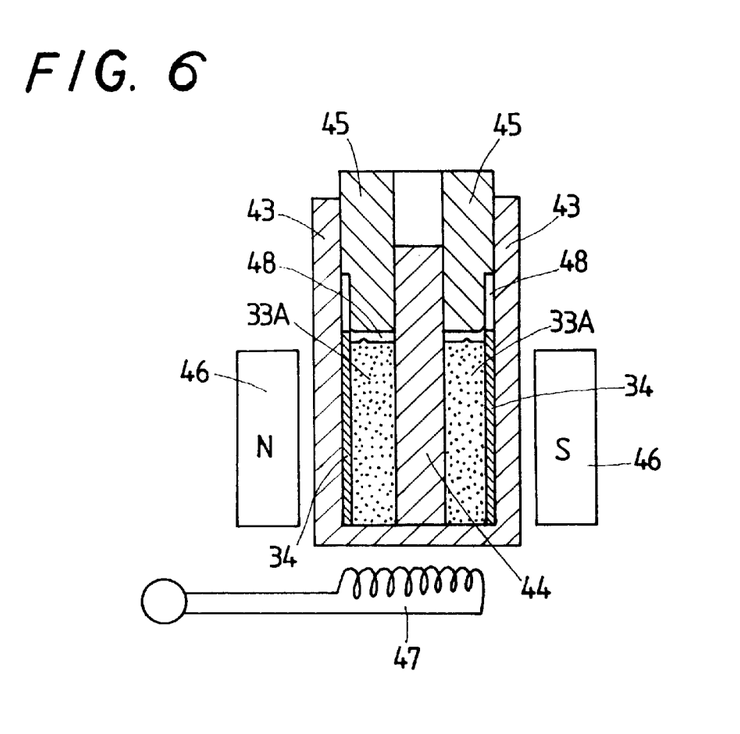
FIG. 6 is a schematic diagram describing a method of manufacturing the rotor of FIG. 5.

A second example of a generator in which the rotor according to the present invention is incorporated will now be described with reference to FIGS. 5 and 6.

The generator in the second example has mainly a rotary shaft 32 supported rotatably on a case 31, which comprises a pair of housings 31A, 31B, via a pair of bearings 38, a rotor 35 mounted fixedly on the rotary shaft 32, and a stator 36 provided around an outer circumference of the rotor 35 and fixed to the case 31 with a clearance 49 formed between the stator 36 and rotor 35. The rotor 35 is engaged at one end thereof with a stopper 39 mounted on the rotary shaft 32, and fixed at the other end to the rotary shaft 32 by a locking nut 40 screwed to the rotary shaft 32. A transmission gear 41 is mounted fixedly on one end of the rotary shaft 32, and an input or output gear 42 is meshed with the transmission gear 41. The stator 36 is formed by winding a stator coil 37 around thin laminated plates. For example, when the gear 42 is connected to an output shaft of an engine, the rotational force of the engine is transmitted to the rotary shaft 32 of the generator, and electric power is produced by the generator.

The rotor 35 comprises cylindrically arranged members 33 formed of permanent magnets, and a thin-walled outer cylinder 34 provided around the outer circumferences of the cylindrically arranged members 33 and comprising windings or woven cloths of carbon fibers or ceramic fibers. The cylindrically arranged members 33 are formed by packing mixed magnetic powder of raw materials, such as iron, neodymium, samarium and cobalt in an outer cylinder 34 placed in a sintering mold, increasing the density of the powder by molding and solidifying the same, sintering the resultant molded bodies, and magnetizing the sintered bodies by applying a magnetic field of NS poles thereto.

The outer cylinder 34 positioned on the outer circumferences of the cylindrically arranged members 33 is formed out of a nonmagnetic material obtained by melting a plastic, i.e. a resin material and impregnating windings or woven cloths of carbon fibers or ceramic fibers with the molten resin material. This resin material permeates into the whole of the windings, and can fix the windings so as to maintain the shape of the same. Accordingly, it becomes possible to grind the outer circumferential surface of the outer cylinder 34, so that an outer surface of the rotor 35 can be ground with a high-precision.

In order to improve the compatibility of the outer cylinder 34 and cylindrically arranged members 33 to each other, a thin member of elastic carbon or graphite can be provided on the inner side of the outer cylinder 34. The resin material constituting the outer cylinder 34 contains a ceramic fiber material of a high heat conductivity, such as AlN and SiC so as to improve the strength and heat conductivity of the resin material. Aluminum or an alloy thereof can be permeated into the resin material constituting the outer cylinder 34. Iron powder can be mixed in the resin material so as to improve the permeability of the outer cylinder 34.

A method of manufacturing the structure of a rotor incorporated in the generator of a second example will now be described.

This rotor manufacturing method has mainly the steps of forming a thin-walled cylindrical outer cylinder 34 by winding up carbon fibers or ceramic fibers, placing the outer cylinder 34 in a mold formed of a nonmagnetic material and comprising an annular mold 43 and a core 44 provided in the center of the annular mold, packing magnetic powder 33A of a raw material, such as iron and neodymium in a space on the inner side of the outer cylinder 31, increasing the density of the magnetic powder 33A by pressure molding the same, and then thermally sintering the magnetic powder 33A while magnetizing the same by applying a magnetic field 46 of NS poles in an oxygen free atmosphere comprising an inert gas and a $N_2$ gas, to turn the magnetic powder into cylindrically a ranged members 33 of permanent magnets. This rotor manufacturing method has a step of permeating under pressure a resin material into a clearance, which occurs in boundary portions between the outer cylinder 34 and cylindrically arranged members 33 of permanent magnets during the sintering of the magnetic powder. The resin material contains ceramic fibers of AlN and SiC of a high heat conductivity mixed therein, so as to improve the strength and heat conductivity thereof.

In the second example, a thin-walled outer cylinder 34 in which windings or woven cloths of carbon continuous fibers or ceramic fibers are solidified by a resin material is formed first as a member for reinforcing sintered bodies. The outer cylinder 34 is placed in a mold 43 constituting a sintering mold, and a core 44, which constitutes the sintering mold, in the outer cylinder 34, magnetic powder 33A containing elements, such as iron, neodymium, samarium and cobalt being packed between the outer cylinder 34 and core 44. A nitrogen gas 48 is then sealed as an inert gas in the mold, and the magnetic powder is compression molded to obtain molded bodies, which are then sintered at a high temperature of, for example, 1300° C. by a heater 47, a magnetic field 46 being applied to the molded bodies so that magnetic poles occur in a predetermined direction, whereby the lines of magnetic force are set in order, the molded bodies being thereby magnetized. The molded bodies are set to the shapes substantially identical with predetermined shapes prior to a sintering operation so that the molded bodies have high-precision final shapes.

A resin material is supplied from a high-pressure tank provided above the mold 43 and core 44 and capable of supplying a resin material to the mold. After the molded bodies of the magnetic powder 33A has been sintered, clearances occur in some parts of the interior of the mold, i.e., between the outer cylinder 34 and sintered bodies. A molten resin material supplied from the high-pressure tank is then permeated into the clearances occurring in boundary portions between the outer cylinder 34 and cylindrically arranged members 33 of sintered bodies, and the molten resin material permeated into the clearances is solidified. During this time, the resin material from the high-pressure tank permeates into the clearances in the windings or woven cloths of carbon fibers or ceramic fibers of the outer cylinder 34 as well, whereby the fixed condition of the outer cylinder 34 and permanent magnets of the cylindrically arranged members 33 is rendered stable and strong.

Figure 7:
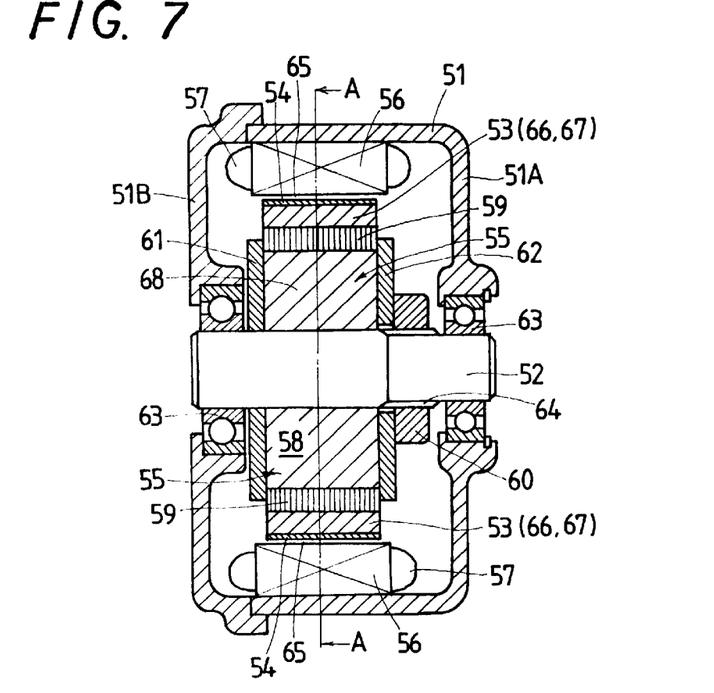
FIG. 7 is a sectional view showing a third example of a generator in which the structure of a rotor according to the present invention is incorporated.
Figure 8:
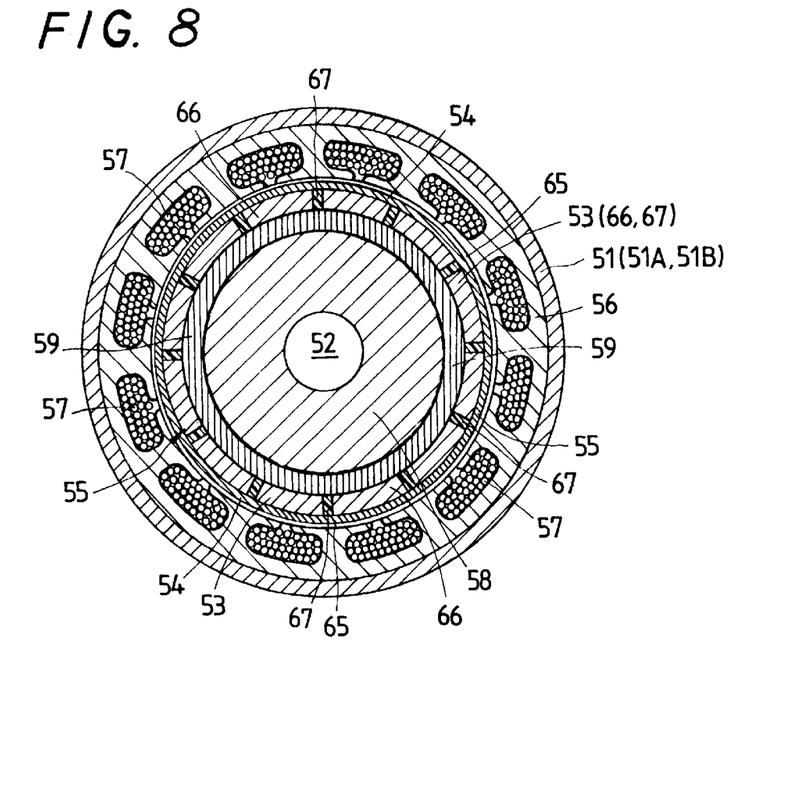
FIG. 8 is a sectional view showing the generator of FIG. 7 and taken along the line A—A therein.

A third example of a generator in which the rotor according to the present invention will now be described with reference to FIGS. 7 and 8.

When, for example, a rotary shaft 52 of the generator of a third example is connected to an output shaft of an engine of a cogeneration system, or an engine of a hybrid car provided with both a motor-generator and an engine, the rotational force of the engine is transmitted to the generator, and electric power is produced by the generator. Accordingly, a large-sized generator can be formed.

The generator of the third example has a large-diameter rotary shaft 52 supported rotatably on a housing 51, which comprises a pair of housing members 51A, 51B, via a pair of bearings 63, a rotor comprising permanent magnets mounted fixedly on the rotary shaft 52, i.e. a rotor 55, and a stator 56 provided around an outer circumference of the rotor 55 and fixed to the housing 51 with a clearance 65 formed between the stator 56 and rotor 55. The rotor 55 is engaged at one end thereof with a stopper 61 mounted on the rotary shaft 52, and fixed at the other end thereof to the rotary shaft 52 via a backplate 62 by a lock nut 60 screwed to a threaded portion 64 of the rotary shaft 52. For example, a transmission gear is mounted fixedly on one end of the rotary shaft 52, and a gear mounted on a shaft, such as an output shaft of an engine is meshed with this transmission gear. The stator 56 is formed by winding a stator coil 57 around thin laminated plates.

The generator of the third example is characterized by the structure of the rotor 55 mounted fixedly on the rotary shaft 52, especially, by the structure of large-diameter cylindrical porous member 58 fixedly mounted on the rotary shaft 52, the structure of large-diameter cylindrically arranged permanent magnets and a fixing structure between the permanent magnets and rotary shaft 52.

The rotor 55 comprises cross-sectionally nearly rectangular slightly curved segmental members 66 of permanent magnets, cylindrically arranged members 53 provided between the segmental members 66 and formed of a resin material 67, a reinforcement member 54 provided around outer circumferences of the cylindrically arranged members 53 and comprising a nonmagnetic material reinforcing the same members 53, a cylindrical laminated member 59 provided on the inner side of the cylindrically arranged members 53 and comprising a permeable material, and cylindrical porous member 58 provided on the inner side of the cylindrical laminated member 59, mounted fixedly on the rotary shaft 52 and impregnated with a resin material. The cylindrical laminated member 59 is formed by laminating a plurality of permeable silicon steel plates in the axial direction on the inner circumferential side of the segmental members of permanent magnets. This enables a generator having a low resistance of a magnetic flux passage, capable of preventing the occurrence of an eddy electric current and having a high output to be formed.

The reinforcement member 54 can be made by solidifying nonmagnetic carbon fibers or ceramic fibers by a resin material. The reinforcement member 54 is formed of windings obtained by winding up long carbon fibers, and can be finished by solidifying the windings by a resin material, the resultant reinforcement member 54 being provided on the outer circumferences of the cylindrically arranged members 53 of permanent magnets, whereby the cylindrically arranged members 53 can be reinforced strongly. The reinforcement member 54 can also be formed of a cylindrical member of nonmagnetic stainless steel. In this case, the reinforcement member 54 and cylindrically arranged members 53 can be united firmly by injecting a resin material into the clearances therebetween.

The resin material 67 provided between the segmental members 66 of permanent magnets constituting the rotor 55 can contain ceramic fibers or carbon fibers of a high heat conductivity so as to improve the strength and heat conductivity thereof. The ceramic fibers of a high heat conductivity, such as AlN and SiC can also be mixed in the ceramic material 67 so as to improve the strength and heat conductivity thereof. The resin material with which the cylindrical porous member 58 is impregnated contains iron powder so as to improve the permeability thereof. The resin material 67 provided between the segmental members 66 and the resin material with which the cylindrical porous member 58 is impregnated can comprise the same material.

When electric power is generated by rotating the rotor 55, the generated power increases in proportion to the rotational frequency thereof, and the centrifugal force of the rotor also increases accordingly. Since the structure of this rotor is formed as described above, it can be applied to a generator having a large-sized rotor of, for example, not less than 100 mm in diameter, and sufficiently withstand a large centrifugal force occurring during an operation of the generator, so that the rotor can be rotated in a well-balanced condition. Unless the permanent magnets constituting the rotor 55 are formed to minimum sizes when the rotor 55 is applied to a large-sized generator, the manufacturing cost increases. However, the permanent magnet of the rotor 55 comprises a plurality of segmental members 66, so that the rotor meets the requirements satisfactorily and can be manufactured at a low cost.

In the rotor 55, the reinforcement member 54 comprising nonmagnetic stainless steel, ceramic fibers or carbon fibers is provided around outer circumferences of the cylindrically arranged members 53 of permanent magnets so as to increase the strength of the permanent magnets, i.e. cylindrically arranged members 53, so that the breakage of the rotor due to the centrifugal force thereof occurring when the rotor is rotated at a high speed can be prevented. The cylindrically arranged members 53 can also be fitted in grooves provided in the cylindrical laminated members 59 comprising a plurality of cylindrical silicon steel plates of a high permeability, and the resultant product can be fitted and fixed in a stainless steel cylinder constituting the reinforcement member 54.

On the inner side of the cylindrical laminated members 59 comprising a plurality of silicon steel plates, cylindrical porous member 58 comprising a ceramic material or a metal is provided. Therefore, the rotor as a whole can be formed to a large diameter, and the rigidity and strength thereof are improved. The cylindrical porous member 58 is mounted on the rotary shaft 52, and a shaft, which comprises the cylindrical porous member 58 and rotary shaft 52 can be formed to a large diameter but the weight of the shaft as a whole can be set to a low level since a resin material is injected into the cylindrical porous member 58. The rotor 55 is completed by injecting a resin material into clearances in the reinforcement member 54 of a stainless steel cylinder, clearances between the segmental members 66 of permanent magnets and clearances in the cylindrical porous member 58.

Since the rotor 55 is formed as described above, the rigidity thereof as a whole becomes very high, and the rotor can be formed to small weight, and becomes able to withstand a high-speed rotation sufficiently and obtain a high output.

A method of manufacturing permanent magnets constituting the rotor 55 will now be described.

In order to produce the segmental members 66 of permanent magnets, magnetic powder containing elements, such as iron, neodymium, samarium and cobalt is packed in a mold comprising semicircular or fan-shaped segments, and the resultant powder is solidified by compression molding the same at a high temperature to obtain molded bodies, which are then sintered while applying thereto a magnetic field so that magnetic poles occur in a predetermined direction, whereby lines of magnetic force are set in order. During this time, the molded bodies in the segments are set to shapes substantially identical with predetermined shapes prior to a sintering operation so that the molded bodies have high-precision final shapes. The segmental members 66 of sintered permanent magnets are then taken out of the mold.

A thin-walled outer cylinder is made by winding up long carbon fibers and solidifying the windings by a resin material, as a member for reinforcing the sintered bodies. The thin-walled outer cylinder is then placed in a gypsum mold comprising a core and an outer mold member, and the segmental members 66 of permanent magnets are then fitted in an inner side of the thin-walled outer cylinder with clearances formed between the segmental members 66 and core and between adjacent segmental members 66. A lid is then placed and fixed on an upper portion of the gypsum mold comprising the core and outer mold member.

A resin material 67 for a mixed material in which carbon fibers are contained in a resin is supplied from a high-pressure tank into the clearances between the segmental members 66 and core and between adjacent segmental members 66 through a supply passage formed in the lid, and packed therein. The resin material 67 is thus buried in these clearances and solidified. During this time, the resin material 67 in the mixed material from the high-pressure tank is permeated into the thin-walled outer cylinder through the clearances between the segmental members 66, and united with the carbon fibers of the thin-walled outer cylinder, whereby the very strongly fixed cylindrically arranged members 53 comprising permanent magnets are formed. The solidified cylindrically arranged members 53 are then taken out from the gypsum mold. The cylindrical laminated members 59 of a permeable material are then fitted in the inner side of the cylindrically arranged members 53 as mentioned above, and the cylindrical porous member 58 in the inner side of the cylindrical laminated members 59. The cylindrical porous member 58 is impregnated with a resin material to complete the rotor 55. The cylindrical porous member 58 of the rotor 55 is fitted around the rotary shaft 52, and the tightening nut 60 is screwed to the threaded portion 64 of the rotary shaft 52, whereby a generator can be assembled.

Figure 9:
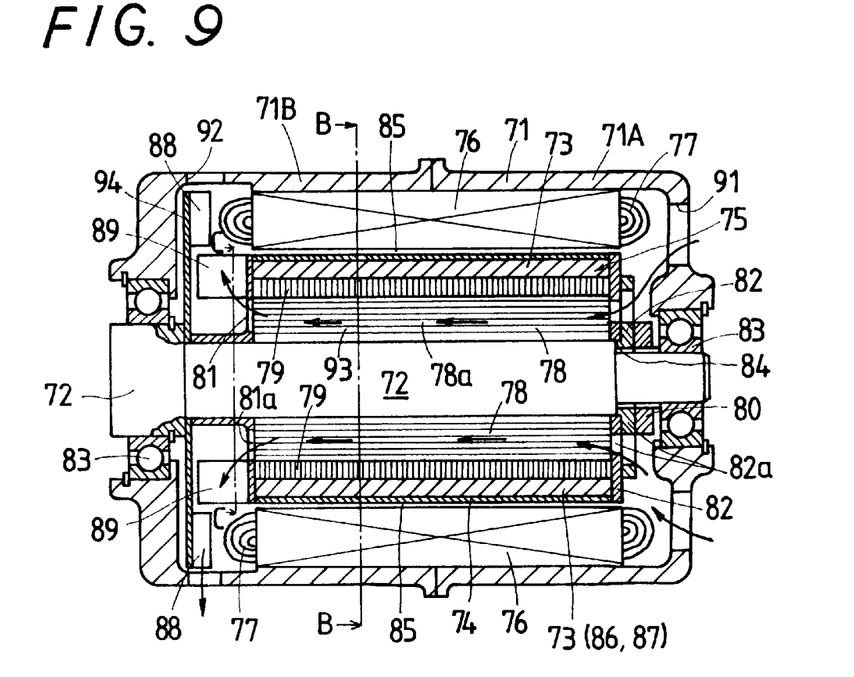
FIG. 9 is a sectional view showing a fourth example of a generator in which the structure of a rotor according to the present invention is incorporated.
Figure 10:
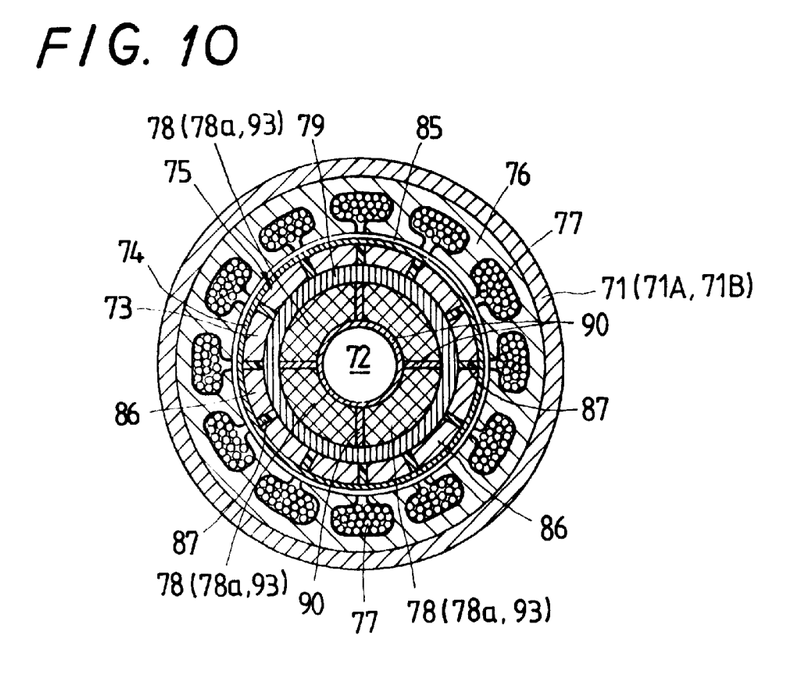
FIG. 10 is a sectional view showing the generator of FIG. 9 and taken along the line B—B therein.
Figure 11:
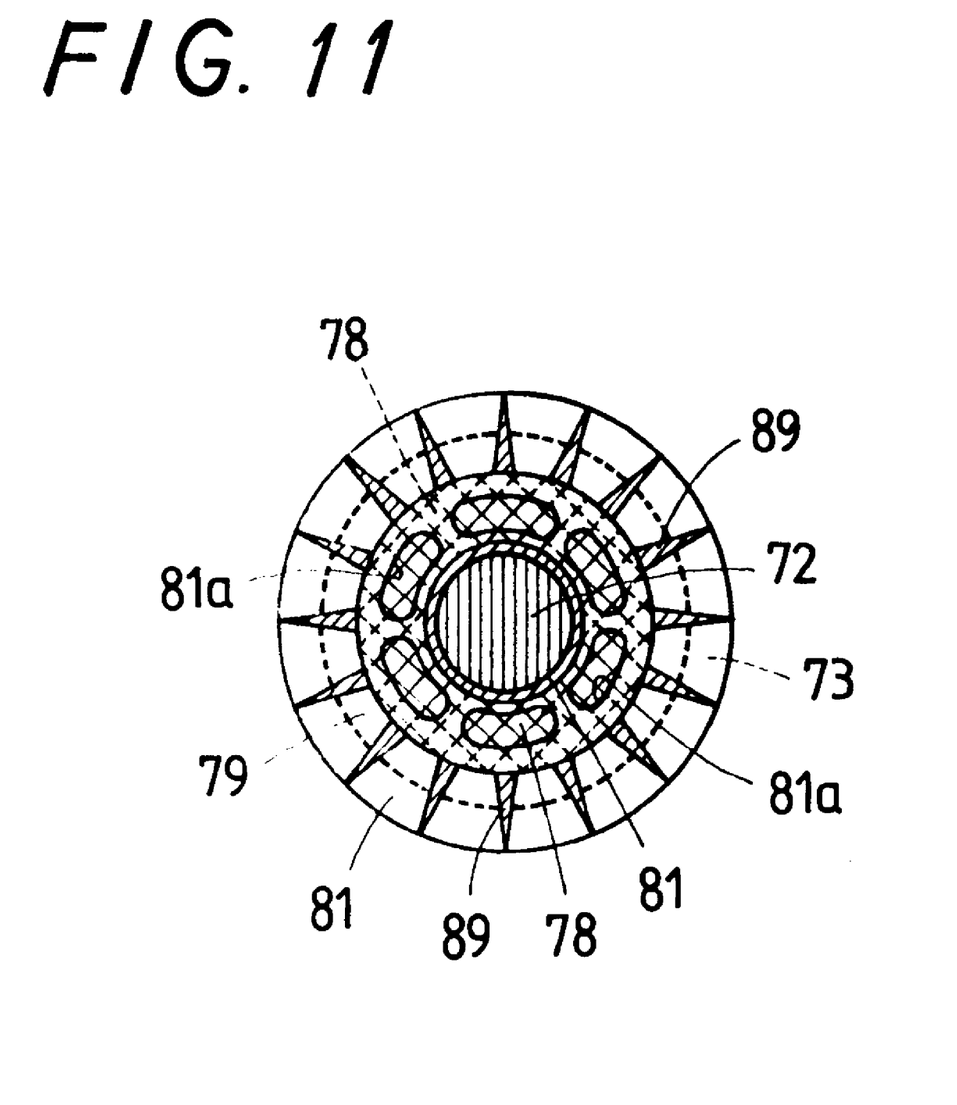
FIG. 11 is an enlarged sectional view showing the portions of the rotor of FIG. 9 which are in the vicinity of fins and stoppers, and taken along the line C—C therein.

A fourth example of a generator in which the rotor according to the present invention is incorporated will now be described with reference to FIGS. 9–11.

When the generator of the fourth example is connected at, for example, a rotary shaft 72 thereof to an output shaft of an engine of a cogeneration system or an engine of a hybrid car directly or via a transmission means, the rotational force of the engine is transmitted to the generator to have the generator produce electric power, whereby a large-sized generator can be formed.

The generator of the fourth example has mainly a rotary shaft 72 of a large diameter supported rotatably on a housing 71, which comprises a housing member 71A provided with through ports 91 in an end wall thereof, and a housing member 71B provided with through ports 92 in an outer circumferential wall thereof, via a pair of bearings 83, a rotor comprising permanent magnets mounted fixedly on the rotary shaft 72, i.e. a rotor 75, and a stator 76 provided around an outer circumference of the rotor 73 and fixed to the housing 71 with a clearance 85 formed between the stator 76 and rotor 75.

In the fourth example, a loss decreases, and an output increases as the width of the clearance 85 between the rotor 75 and stator 76 decreases. The rotor 75 is engaged at one end thereof with a stopper 81 of a nonmagnetic material mounted on the rotary shaft 72 and provided with a through port 81*a*, and fixed at the other end thereof to the rotary shaft 72 by a lock nut 80 screwed to a threaded portion 84 of the rotary shaft 72, via a backplate 82 provided with a through port 82*a*. For example, a transmission gear (not shown) is mounted fixedly on one end of the rotary shaft 72, and a gear mounted on a shaft, such as an output shaft of an engine is meshed with the transmission gear. The stator 76 is formed by winding stator coils 77 around thin laminated plates.

The generator of the fourth example is characterized by the structure of the rotor 75 mounted fixedly on the rotary shaft 72, a structure provided with a cooling means, the structure of the permanent magnets of a large diameter cylindrically arranged and fixedly mounted on the large-diameter rotary shaft 72, and a fixing structure between the permanent magnets and rotary shaft 72.

The rotor 75 comprises cylindrically arranged members 73 obtained by assembling together cross-sectionally substantially rectangular, somewhat curved segmental members 86 formed of permanent magnets, and connecting members 87 provided between the segmental members 86 and formed out of a metal or a resin material; a reinforcement member 74 of a nonmagnetic material provided around the outer circumferences of the cylindrically arranged members 73 and reinforcing the same members 73; cylindrically arranged laminated members 79 provided on the inner side of the cylindrically arranged members 73 and formed out of a permeable material; a cylindrical porous member 78 of a honeycomb structure provided on the inner side of the cylindrically arranged laminated members 79 and mounted fixedly on the rotary shaft 72; and a cooling fan 88 adapted to cool the cylindrical members 73, 78, 79 with an air current and mounted on the rotary shaft 72.

The cooling fan 88 comprising a centrifugal fan is mounted on the rotary shaft 72 via support arms 94. A suction air current generated by the cooling fan 88 produces a flow of air advancing from one through port 91 of the housing 71 and discharged to the other through port 92 of the housing 71 through air passages 78*a* of the cylindrical porous member 78. The stopper 81 mounted on the portion of the rotary shaft 72 which corresponds to an air current upstream side portion of the cooling fan 88 is provided with air current guiding fins 89. The fins 89 can also be fixed to an extension portion of the segmental members 86 or cylindrical laminated members 79. The fins 89 comprise a material, such as an aluminum alloy, and are provided plurally so as to be spaced from one another in the circumferential direction of the stopper 81. The cylindrical laminated members 79 are formed by laminating a plurality of cylindrical silicon steel plates of a permeable material in the axial direction, and have a low resistance of magnetic flux passages, prevents the occurrence of an eddy electric current and can form a high output generator.

The cylindrical porous member 78 is formed of a honeycomb structure of a metal or a resin material, and provided with reinforcement members 90 constituting ribs extending circumferential direction, and spaced from one another and extending radially and circumferentially with respect to the honeycomb structure 93. Owing to the honeycomb structure, the cylindrical porous member 78 has a plurality of air ports 78*a* extending from one axial end thereof to the other. The reinforcement members 90 can be formed by injecting a molten ceramic material or an aluminum alloy (when silicon is contained therein, the strength of the material increases) into predetermined portions of the honeycomb structure to produce ribs. For example, in order to make the cylindrical porous member 78, for example, fan-shaped honeycomb portions 93 are arranged cylindrically in a mold, and a molten aluminum alloy or a molten resin material can be injected into clearances between these honeycomb portions. In another example, the cylindrical porous member 78 are generally formed by a honeycomb structure, and sand is packed in the regions in which the air ports 78*a* are to be formed, molten aluminum being injected into the other regions, whereby the reinforcement members 90 can be made. When the reinforcement members 90 of the cylindrical porous member 78 are formed out of a resin material, iron powder can be contained in this material so as to improve the permeability thereof.

The reinforcement member 74 can be formed by solidifying nonmagnetic carbon fibers or ceramic fibers by a resin material. During this time, the reinforcement member 74 is formed of windings of long carbon fibers which are solidified by a resin material. This reinforcement member 74 is provided around the cylindrically arranged members 73 comprising permanent magnets, whereby the cylindrically arranged members 73 can be reinforced strongly. The reinforcement member 74 can also be formed by a cylindrical member of nonmagnetic stainless steel. In this case, a molten metal, such as molten aluminum alloy or a resin material is injected into clearances between the reinforcement member 74 and cylindrically arranged members 73, and these members 74, 73 can thereby be united together firmly.

When the connecting members 87 provided between the segmental members 86 of permanent magnets constituting the rotor 75 are formed out of a resin material, ceramic fibers or carbon fibers of a high heat conductivity can be mixed in the resin material so as to improve the strength and heat conductivity. The resin material of the connecting members 87 can also contain ceramic fibers of a high heat conductivity, such as AlN and SiC so as to improve the strength and heat conductivity of the resin material. The connecting members 87 provided between the segmental members 86 and reinforcement members 90 inserted in the cylindrical porous member 78 can also be formed by injecting the same material, for example, a molten aluminum alloy into predetermined clearances.

When electric power is generated by revolving the rotor 75, the generated electric power increases in proportion to the rotation speed of the rotor, and the centrifugal force of the rotor increases accordingly. Since the rotor 75 is formed as described above, it can be applied to a generator having a large-sized rotor of, for example, not less than 100 mm in diameter, and withstand satisfactorily a large centrifugal force occurring therein, the rotor being able to be rotated in a well-balanced condition. The rotor 75 used in a large-sized generator causes the cost to increase unless the permanent magnets are formed to the smallest possible sizes. However, the permanent magnets of the rotor 75 according to the present invention comprise a large number of segmental members 86, so that the rotor 75 sufficiently satisfies the requirements.

The cylindrically arranged members 73 comprising permanent magnets constituting the rotor 75 are reinforced by a reinforcement member 74 which is formed out of non-magnetic stainless steel, ceramic fibers or carbon fibers, and which is provided around the outer circumferences of the cylindrically arranged members, so as to increase the strength of the permanent magnets, so that the breakage of the rotor 75 due to a centrifugal force thereof during a high-speed rotation thereof is prevented. The cylindrically arranged members 73 can also be fitted in grooves, which are formed by grooving the cylindrical laminated members 79 comprising a large number of cylindrical silicon steel plates of a high permeability, and the resultant product can be fitted and fixed in a SUS cylinder constituting the reinforcement member 74.

On the inner side of the cylindrical laminated members comprising a large number of cylindrical silicon steel plates, the cylindrical porous member 78 of ceramic material or a metal is provided, and the strength of the rotor 75 as a whole is thereby increased. The molten aluminum or a resin material is injected into the clearance of the reinforcement member 74 of a SUS cylinder, clearances between the segmental members 86 of permanent magnets, and hollows in which sand is not packed of the cylindrical porous member 78 to complete the rotor 75.

Since the rotor 75 is formed as described above, the cooling fan 88 is rotated with the rotation of the rotary shaft 72, and sucks air from the rotor 75, so that the rotor 75 is generally cooled with the air. This enables the occurrence of demagnetization of the permanent magnets constituting the cylindrically arranged members 73 to be prevented, the rotor 75 to be formed to a very high rigidity and small weight, the rotor 75 to satisfactorily withstand a high-speed rotation thereof, and a high output to be obtained.

A method of manufacturing permanent magnets constituting the rotor 75 will now be described. For example, in order to produce the segmental members 86 of permanent magnets, magnetic powder containing elements, such as iron, neodymium, samarium and cobalt is packed in a mold comprising semicircular or fan-shaped segments, and the resultant magnetic powder is compression molded and solidified at a high temperature to obtain molded bodies, which are sintered while applying a magnetic field thereto so that magnetic poles occur in a predetermined direction with the lines of magnetic force set in order. During this time, the molded bodies of the segmental members are set to nearly predetermined shapes prior to a sintering operation so that the segmental members have final high-precision shapes. The segmental members 86 of sintered bodies of permanent magnets are then taken out from the mold. A thin-walled outer cylinder is made as a member for reinforcing the sintered bodies by winding long carbon fibers, and solidifying the resultant windings by a resin material. This thin-walled outer cylinder is then placed in a gypsum mold comprising a core and an outer mold member, and the segmental members 86 of permanent magnets are fitted in the thin-walled outer cylinder with clearances formed between the segmental members 86 and core and between adjacent segmental members 86. A lid is placed and fixed on the gypsum mold comprising the core and outer mold member.

A resin material for a mixed material in which carbon fibers are contained in a resin is supplied from a high-pressure tank into the clearances between the segmental members 86 and core and between adjacent segmental members 86 through a supply passage formed in the lid, and packed therein. The resin material is thus buried in the clearances, solidified and turned into connecting members 87. During this time, the resin material in the mixed material from the high-pressure tank is permeated into the thin-walled outer cylinder as well and united with the carbon fibers of the thin-walled outer cylinder, whereby the very strongly fixed cylindrically arranged members 73 comprising permanent magnets are formed. The solidified cylindrically arranged members 73 are then taken out from the gypsum mold. The cylindrical laminated members 79 of a permeable material are then fitted in the inner side of the cylindrically arranged members 73 as mentioned above, and the cylindrical porous member 78 having air passages 78a in the inner side of the cylindrical laminated members 79 to complete the rotor 75. The cylindrical porous member 78 of the rotor 75 is fitted around the rotary shaft 72, and the lock nut 80 is screwed to the threaded portion 84 of the rotary shaft 72, whereby a generator is assembled.

What is claimed is:

1. A structure of a rotor for a generator comprising a case, a rotor including a rotary shaft supported rotatably in said case, and a stator provided around an outer circumference of said rotor and fixed to said case;

said rotor comprising segmental members of sintered permanent magnet which are arranged cylindrically about said rotary shaft and extend along said rotary shaft, an outer cylinder including at least one of windings and woven cloths of fibers which are arranged around an outer circumferences of said cylindrically arranged segmental members, and easily-machined nonmagnetic material filling between any adjoining two of said segmental members and any adjoining fibers of any one of the windings and woven cloth;

wherein said segmental members are formed by sintering a mixed powder of materials including at least iron, neodymium, samarium, and cobalt;

wherein said segmental members include a cross sectional configuration which is nearly rectangular and slight-curved;

said segmental members being set as alternating N-S poles and including said nonmagnetic material between adjacent ones of the segmental members;

wherein said nonmagnetic material includes a resin material interposed between said segmental members, and said resin material contains fibers of high heat conductivity mixed therein so as to increase the strength and heat conductivity thereof, and wherein cylindrical laminated members comprising a permeable material are provided on an inner side of said cylindrically arranged segmental members, a cylindrical porous member mounted fixedly on said rotary shaft and comprising a resin material impregnated nonmagnetic structural material on an inner side of said cylindrical laminated members.

2. A structure of a rotor for a generator according to claim 1, comprising an inner cylinder, including the resin material, on an inner circumference of said cylindrically arranged members.

3. A structure of a rotor for a generator according to claim 1, wherein said windings of said fibers constituting said outer cylinder are solidified by a resin material comprising said nonmagnetic material.

4. A structure of a rotor for a generator according to claim 1, wherein said fibers mixed in said resin material include any one of ceramic fibers and carbon fibers.

5. A structure of a rotor for a generator according to claim 1, wherein any one of aluminum and an alloy thereof is fused to first boundary portions between said outer cylinder and said cylindrically arranged segmental members and second boundary portions between said cylindrically arranged segmental members and said inner cylinder, and wherein said outer cylinder is reinforced with windings of ceramic fibers.

6. A structure of a rotor for a generator according to claim 5, wherein said inner cylinder and said boundary portions contain iron powder, whereby permeability thereof is improved.

7. A structure of a rotor for a generator according to claim 1, wherein said outer cylinder, said inner cylinder, and said boundary portions include the resin material, and wherein resin portions thereof have a thickness including a grinding margin.

8. A structure of a rotor for a generator according to claim 1, wherein said outer cylinder comprises an aluminum material having a thickness including a grinding margin.

9. A structure of a rotor for a generator according to claim 1, wherein said windings constituting said outer cylinder are formed of any one of carbon fibers and ceramic fibers, and said cylindrically arranged segmental members are formed by molding and solidifying a mixed powder of materials including at least iron, neodymium, samarium and cobalt, sintering the resultant product, and magnetizing the sintered product.

10. A structure of a rotor for a generator according to claim 9, wherein said outer cylinder is formed by melting said resin material and impregnating any one of windings and woven cloths of any one of carbon fibers and ceramic fibers with the resultant molten resin material.

11. A structure of a rotor for a generator according to claim 10, wherein said cylindrically arranged segmental members comprising permanent magnets are sealed in said outer cylinder comprising any one of windings and woven cloths of ceramic fibers.

12. A structure of a rotor for a generator according to claim 10, wherein a thin-walled member of any one of elastic carbon and graphite is provided on an inner side of said outer cylinder so as to improve the compatibility of said outer cylinder and said cylindrically arranged segmental members with each other.

13. A structure of a rotor for a generator according to claim 1, wherein cylindrical laminated members comprising a permeable material are provided on an inner side of said cylindrically arranged segmental members, a cylindrical porous member mounted fixedly on said rotary shaft and comprising a resin material impregnated nonmagnetic structural material on an inner side of said cylindrical laminated members.

14. A structure of a rotor for a generator according to claim 1, wherein said permanent magnets constituting said cylindrically arranged segmental members are formed by cylindrically arranging cross-sectionally nearly rectangular fan-shaped segmental members, said segmental members being set as alternating NS poles, said nonmagnetic material being provided between adjacent segmental members.

15. A structure of a rotor for a generator according to claim 1, wherein a reinforcement member constituting said outer cylinder is formed out of nonmagnetic stainless steel into any one of wires and a thin plate.

16. A structure of a rotor for a generator according to claim 1, wherein said cylindrical laminated members are formed by laminating cylindrical silicon steel plates in the axial direction thereof.

17. A structure of a rotor for a generator according to claim 1, wherein said cylindrical porous member is made of a nonmagnetic material selected from stainless steel, aluminum and ceramics of any one of alumina and silicon nitride, said cylindrical porous member being impregnated with a nonmagnetic resin.

18. A structure of a rotor for a generator according to claim 1, wherein housings are provided with through ports through which cooling air passes, said cylindrically arranged segmental members are formed of permanent magnets combined together cylindrically, said rotor being provided with cylindrical laminated permeable members disposed on an inner side of said cylindrically arranged segmental members, a cylindrical porous member disposed on an inner side of said cylindrical laminated members, mounted fixedly on said rotary shaft, having air ports extending from one end thereof to the other and comprising a nonmagnetic material, and a cooling fan mounted on said rotary shaft so as to cool said cylindrically arranged segmental members with an air current.

19. A structure of a rotor for a generator according to claim 18, wherein said permanent magnets constituting said cylindrically arranged segmental members are formed by cylindrically arranging cross-sectionally nearly rectangular fan-shaped segmental members, said segmental members being set as alternating NS poles, nonmagnetic materials being provided between adjacent segmental members.

20. A structure of a rotor for a generator according to claim 18, wherein said cooling fan comprises a centrifugal fan, whereby an air current is generated which flows from said ports in one end of said housings to said ports in the other through said air ports in said cylindrical porous member.

21. A structure of a rotor for a generator according to claim 20, wherein said rotary shaft is provided on the portion thereof which is on the air current upstream side of said centrifugal fan with fins for guiding said air current to extension portions of said segmental members or said cylindrical laminated members.

22. A structure of a rotor for a generator according to claim 18, wherein said cylindrical porous member is formed of honeycomb portions comprising said air ports, and reinforcement portions comprising a metal or a resin material extending circumferentially in part and radially so as to reinforce said honeycomb portions.

23. A structure of a rotor for a generator according to claim 18, wherein said clearances between said segmental members constituting said rotor and the reinforcement portions of said cylindrical porous member have structures formed by pouring molten aluminum thereinto and solidifying the same.

* * * * *